United States Patent [19]
Wilensky

[11] Patent Number: 5,084,187
[45] Date of Patent: Jan. 28, 1992

[54] THREE PHASE SEPARATION PROCESS

[76] Inventor: Joseph Wilensky, 44 S. Adams St., #131, Denver, Colo. 80209

[21] Appl. No.: 701,452

[22] Filed: May 15, 1991

[51] Int. Cl.⁵ ............................ C02F 1/22; B01D 9/04
[52] U.S. Cl. .................................... 210/768; 210/774; 210/805; 210/808; 62/532
[58] Field of Search ............... 210/742, 774, 768, 805, 210/808; 62/532; 159/DIG. 5

[56] References Cited

U.S. PATENT DOCUMENTS

| | | | |
|---|---|---|---|
| 3,070,969 | 7/1960 | Ashley | 62/537 |
| 3,213,633 | 10/1965 | Rosenstein et al. | 210/774 |
| 3,214,371 | 10/1965 | Tuwiner | 210/711 |
| 3,664,145 | 5/1972 | Johnson | 62/537 |
| 4,236,382 | 12/1980 | Cheng | 62/537 |
| 4,505,728 | 3/1985 | Cheng et al. | 210/774 |

FOREIGN PATENT DOCUMENTS

0078164 5/1983 European Pat. Off. ............ 62/532

Primary Examiner—W. Gary Jones
Attorney, Agent, or Firm—Dorr, Carson, Sloan & Peterson

[57] ABSTRACT

A solute can be separated from a solute/solvent solution by dissolving a gas into the solution to produce a single phase composite liquid, lowering the temperature of the composite liquid to a certain temperature and then performing a Joule-Thompson free expansion on the composite liquid.

22 Claims, 2 Drawing Sheets

THREE PHASE SEPARATION PROCESS

BACKGROUND OF THE INVENTION

1. Field Of The Invention

This invention is generally concerned with the use of freezing conditions in order to accomplish a degree of separation of a solvent and a solute from a solute/solvent liquid solution. The herein disclosed processes have many useful ecological and industrial purposes, but they are especially well suited to converting sea water, brackish water, etc. into potable water, concentrated brines and purified solutes.

Numerous methods and/or systems have been developed which employ freezing conditions to produce potable water, but they have not experienced wholehearted economic and/or technical acceptance. For example, one of the principal problems inherent in most currently employed desalination processes which employ freezing conditions is their inability to produce potable water at economically acceptable costs. That is to say that not only must a desalination process be able to produce large volumes of potable water, it also must be able to do so at locally acceptable costs. Again, cost considerations are particularly important to this art because many areas of the world having the most acute potable water shortages also are characterized by very low income levels.

In most processes employing freezing conditions to produce potable water, sea water is simply frozen to produce an ice product and/or it is flash-frozen to produce a water vapor product and a slurry of ice and brine. Both of these freezing techniques require a great deal of expensive refrigeration capacity. The flash freezing techniques are especially expensive because they employ vacuum/freezer apparatus wherein a vacuum is created to evaporate the water. This is accomplished by the expenditure of a great deal of mechanical work. The resulting water vapor must be continuously removed from the vacuum/freezer apparatus and then must be condensed to water by another large expenditure of mechanical work. This all goes to say that the refrigeration, vacuum-creation and condensation steps of such processes each require considerable amounts of mechanical and/or electrical energy which can only be obtained at high fuel costs and/or high capital equipment costs. Consequently, freezing and flash-freezing processes to produce potable water have not been widely accepted as economically viable methods of producing potable water.

2. Description of the Prior Art

Some representative freezing techniques heretofore suggested or used for the production of potable water from sea water are taught in the following patent references.

U.S. Pat. No. 4,236,382 teaches a desalination process wherein a deaerated, ice water solution is first flash vaporized under a highly reduced pressure to form a low pressure water vapor brine and ice crystals. The ice is purified in a counter-washer and then melted inside heat conductive conduits under high pressure. The low pressure water vapor is then desublimed to form a desublimate (ice) on the outside of certain conduits employed in this process. This particular process employs the latent heat of desublimation of the desublimate in order to supply the heat needed in the ice making portion of the operation.

U.S. Pat. No. 3,664,145 teaches a method for separating a solvent (e.g., water) in substantially pure form from a solution (e.g., sea water) wherein a vacuum freezer is employed to produce vapors and a slurry of solvent and solute. The product materials are separated by various novel, but complex, mechanical steps which form a large part of this particular patent disclosure.

U.S. Pat. No. 3,070,969 teaches a process which also employs vacuum freezing conditions in order to separate dissolved salts, such as those found in sea water, from a solvent solution. The sea water is vacuum frozen by a novel arrangement of equipment in order to both concentrate the solute salts contained in the liquid component of the solution and in order to collect the solvent component of the solution in the form of a frozen solvent material (e.g., ice).

U.S. Pat. No. 3,214,371 teaches a desalination process which is based upon formation of large ice crystals in brine through the use of certain water clathrate substances such as propane hydrate. The ice crystals are separated from the brine (and from the clathrate substance) and then melted in a process which employs the latent heat absorbing capacity of the ice to further promote formation of a hydrate produced from a brine and water clathrate feedstock.

Again, the principal drawback with most of the above noted freezing or vacuum freezing methods is that the amount of pure water which can be produced thereby is directly proportioned to the size and efficiency of the mechanical compressor(s) needed to produce the refrigeration and/or vacuum freeze conditions necessary to carry out such processes. Again, even under the best of conditions, the economic costs of running such compressors is enormous. Consequently, the extremely high costs of vacuum freeze processes such as these usually can only be justified in processes wherein the value of the end product (e.g., blood plasma and freeze-dried coffee) is very high. They are not normally used to produce potable water, not because they do not work, but rather because they are prohibitively expensive to build, maintain and operate. Moreover, in those cases where vacuum freezing has been used to produce potable water (high costs notwithstanding), the mechanical compressors needed to carry out such processes have been subject to scaling, corrosion and mechanical failure due to the deleterious effects of the salt content and microbiology of sea water.

In response to all of these technical problems and economic circumstances, the herein disclosed processes are intended to provide certain methods, systems and apparatus for separating a solvent (e.g., potable water), in substantially pure form, from a solute/solvent solution (e.g., sea water) at substantially lower costs than those which can be obtained by conventional refrigeration and/or flash freezing methods. These advantages are obtained through the use of a three phase separation process which, among other things, does not require any compressor equipment. It should also be noted that small, conventional, mild steel motive equipment, low pressure vessels and heat exchangers will suffice for use in the processes of this patent disclosure. Moreover, the labor and maintenance requirements of these processes are much less than those associated with compressor equipment.

SUMMARY OF THE INVENTION

The previously noted technical problems and/or economic drawbacks can be avoided, or at least mitigated, by use of certain herein disclosed processes which are based upon a three phase separation of a dissolved gas/solute/solvent solution by use of a Joule-Thompson free expansion of said dissolved gas/solute/-solvent solution after said solution has been properly prepared to undergo the Joule-Thompson free expansion. Among their many advantages, applicant's processes are characterized by the fact that they do not need compressors to create and/or condense water vapor and, hence, completely avoid the considerable costs of purchasing and operating such equipment. Simple pumps are the only items of mechanical work-producing equipment needed to carry out applicant's processes. Again, they are inherently less costly to purchase, power and maintain than compressor units.

The processes of this patent disclosure are particularly well suited to producing potable water from the solvent component of sea water (i.e., water), but it should also be emphasized that these processes also can be readily adapted to target recovery of a solute component (e.g., sodium chloride) from a solvent component (e.g., sea water). Consequently, the herein disclosed three phase separation processes can be used in their own right to produce solute or solvent product(s), or they can be used in conjunction with other processes (e.g., progressive lagoon evaporation processes), to recover products such as the sodium chloride content of sea water.

Moreover, even though applicant's processes are primarily exemplified by and concerned with obtaining potable water from sea water, they also can be readily employed to recover solvents and solutes from industrial processes where water is not employed as the solvent component and/or where water potability, if water is so employed is not a necessary attribute of a water end product of that industrial process. That is to say that, in general, the three phase separation processes described in this patent disclosure may be employed to separate the components of any solute/solvent solution, as long as the solute component is completely dissolved in the solvent component, as long as a gas can be dissolved into the solvent component and as long as the solvent component can be frozen to a solid state by a Joule-Thompson free expansion of the solute/solvent solution under pressure and pressure conditions which are not prohibitively expensive to attain.

As a further aid to understanding the scope of this invention, it also should be noted that the closest previous approaches to the processes of this patent disclosure are "vacuum freezing" methods of the types previously discussed and, that they generally involve subjecting an aqueous solution to high vacuum conditions corresponding to those of the solid water's vapor pressure, but below the unique "triple point" of water. As a result, the water content of solute/solvent solutions employed in these prior art processes is sublimated directly to vapor—rather than first melting to liquid water—while the temperature of the total mass falls below the triple point temperature.

The facts and circumstances associated with these prior art processes are to be contrasted with applicant's process wherein, in effect, use of a high-volatility gas is substituted for the forced evaporation of a solvent a la the evaporation carried out in vacuum freezing processes. Having made this substitution, applicant then seeks to "contrive" certain process parameters so that a pressure/ temperature "venue" is created which is favorable to production of a "spontaneous" evaporation. Obviously, a spontaneous evaporation has inherent economic advantages over evaporations obtained by the expenditure of a great deal of mechanical work.

However, before discussing the process and apparatus details of this invention, certain temperature phase relationships should be described, explained and related to the teachings of this patent disclosure. This is best done by noting what actually happens to a solute/solvent solution as it undergoes a Joule-Thompson free expansion of the type employed in this process. First, it should be understood that it is not necessary to consider the gas component of the herein disclosed solute/solvent solutions because this gas component comes and goes entirely without permanently affecting the solution separation. It should also be noted that applicant's process, like any other similar process, is governed by certain phase-rule relationships prevailing for liquid solutions which are undergoing temperature/pressure changes such as cooling through partial fusion (precipitation) to total solidification of the subject material.

Figure 1:
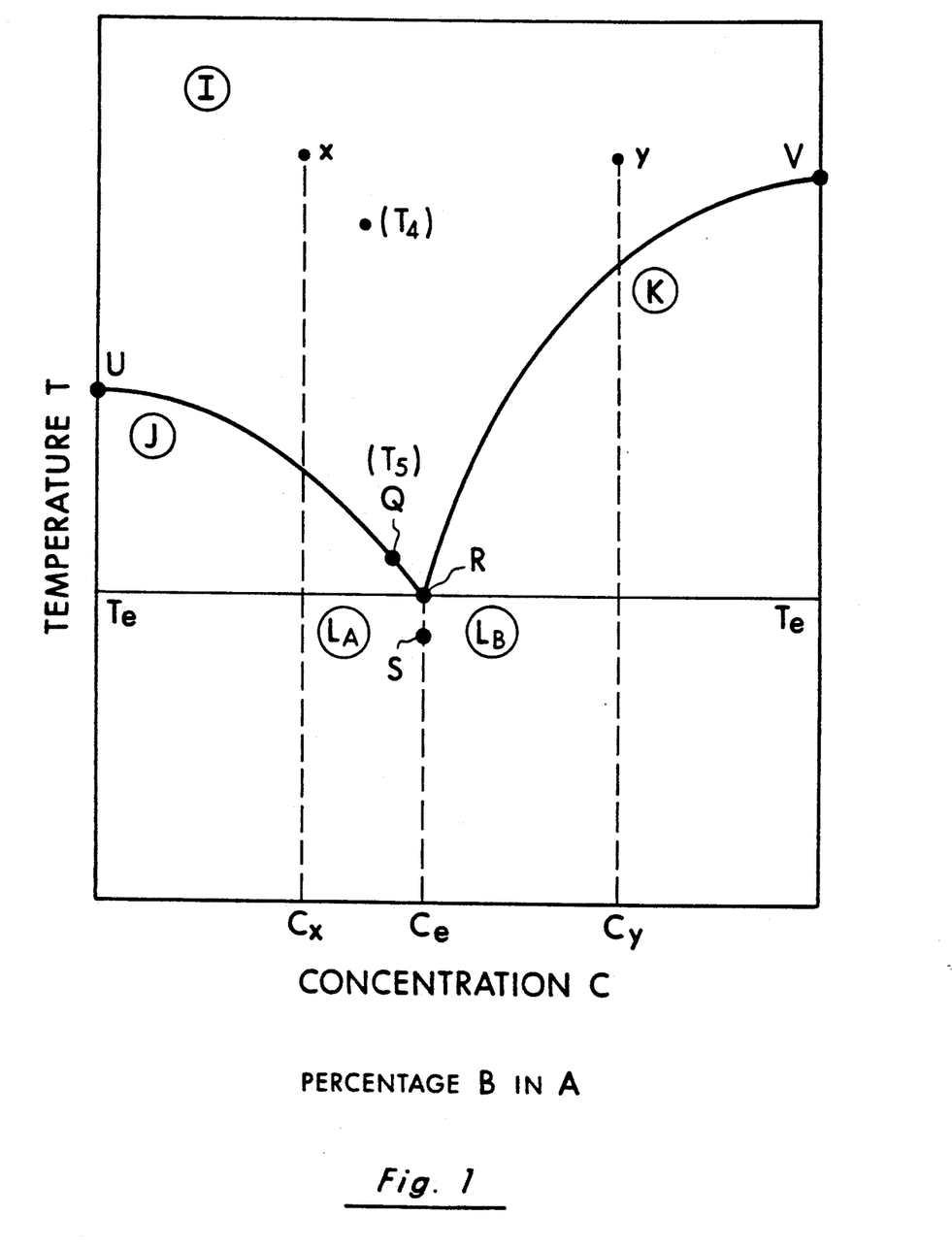
FIG. 1 depicts a temperature-phase relationship diagram of a single solute, single solvent system. It particularly illustrates certain key operating conditions which occur during the Joule-Thompson free expansion step of the herein disclosed process.

In order to aid in this understanding, FIG. 1 graphs the behavior of a typical single species solute in a typical single species solvent. In effect, this graph depicts a temperature-phase relationship of solubility and melting point over a range of total compositional proportions extending well to either side of that particular solubility corresponding to the eutectic composition—the solubility at the minimum solution total freezing point. Those skilled in this art will appreciate that such compositions must satisfy the governing thermodynamic phase-composition relationships typified by a solubility (eutectic) diagram such as the one shown in FIG. 1. It should also be appreciated that the several phase equilibrium regions shown in this diagram also can be related to "Gibb's Phase Rule" which dictates that the number of freely variable conditions ("degrees of freedom") plus the number of phases must equal the number of components, plus two. The degrees of freedom can be temperature and/or pressure and/or compositional variables which amount to the number of components, minus one. The phases can be one gas phase, any number of liquid phases which are discrete (i.e., which do not dissolve in each other) and any number of solid phases so long as one does not constitute a continuous phase.

Again, referring to FIG. 1, it also should be noted that temperature is shown as the graph's ordinate and that the weight percent of the solute in the total liquid solution is shown as shown as its abscissa. Various regions on this graph are delineated by lines and pertain to phase-composition behavior typical of that region. There are two such lines, an upper line formed by the intersection of two arcs (U-R and V-R) meeting at a sharp notch point R at $T_E$ and $C_E$, the "eutectic" temperature and composition and a lower horizontal line ($T_e$-$T_e$). The lower horizontal line ($T_e$-P) passes through point R and depicts a borderline for the complete range of compositions at $T_E$. It is in effect, the ultimate total freezing point for any total liquid composition. The notched curve also forms a lower borderline of initial precipitation of solids from the total liquid. Thus, region I represents a single phase liquid at all compositions.

Next, consider such a two component solution at point X, which represents a particular composition of solute at less than eutectic composition. As the solution cools its composition remains constant until it reaches its boundary arc line (U-R). There, pure solvent will begin to freeze, thereby precipitating pure solid solvent in the remaining liquid. The latter's composition, being solute-enriched by removal of solid solvent, follows the arc U-R in composition relating to the degree of cooling until it reaches $C_E$ and $T_E$, whereupon the whole mass freezes. Conversely, consider point Y at a composition richer in solute than it is at $C_E$. In an analogous manner, upon reaching its arc line (V-R), pure solid solute begins to precipitate, thereby leaving the solution progressively more dilute as the process follows the arc (V-R) relating composition through succeeding lower temperatures. This continues until the material reaches temperature $T_E$ whereupon the remaining liquid at the eutectic composition totally freezes to a solid.

Thus Region I is entirely a single phase liquid; Region J is a liquid mixed with solid precipitated solvent; Region K is liquid mixed with solid precipitated solute; and region L is total two-phase solid (except for a single solid phase at the unique situation of starting with single-phase liquid and ending with single-phase solid, but always at eutectic composition). In sub-region $L_A$, a continuous solid-phase at $C_E$ contains inclusions of solid pure solvent while, on the other hand, sub-region $L_B$ contains a discontinuous phase of solid solute inclusions.

Bearing this in mind, applicant has created a process for separating a solute from a solute/solvent solution by use of process steps which include introduction of a gas (adjusted for quantity and temperature) into a feed liquid (also adjusted for quantity and temperature) in order to: create a single phase composite liquid solution by dissolving the gas in said solution, performing a first heat exchange on said solution in order to remove the heat of condensation of the then dissolved gas from the resulting single phase composite liquid, performing a second heat exchange on the solution in order to lower the temperature of the single phase composite liquid material to a certain temperature which is above the triple point temperature $T_e$ of the single phase composite liquid material and then subjecting said single phase composite liquid material to a Joule-Thompson free expansion in order to form a solid phase material, a liquid phase material, and a vapor phase material and thereby providing a means whereby the solute component of the original solute/solvent solution can be separated from its solvent component. It also should be noted that applicant's separation process can be accomplished in any quantity proportions of liquid solutions of net remaining ingredients when the process is halted at some temperature which is appropriate to some predetermined solute/solvent concentration of the initial feed material.

In any case, the essence of the "controlled heating-cooling approach" taken by the herein disclosed processes begins when a given quantity of source raw material solution (e.g., sea water) is drawn into the system which carries out the process. Preferably the raw material solution will be drawn from a large source which is most preferably large enough (e.g., a body of sea water) to establish, in effect, a constant ambient temperature to serve as a "heat sink" as well as a source of starting material. In some cases it will be preferable, but not mandatory, that the liquid feed material be augmented (by physical mixing of the two liquids) by use of a recycled liquid product of the Joule-Thompson free expansion.

Thereafter, prescribed amounts of a partially soluble gas (at its given temperature) are dissolved into the feed solution. For the purposes of this patent disclosure, the term "partially soluble gas" should be taken to mean that the gas is sufficiently soluble in the solute/solvent solution such that, when a nominal high pressure of the herein disclosed process is released to a nominal low pressure of this process, there will be sufficient reabsorption of the heat of vaporization of said gas to readily vaporize the gas and thereby effect a degree of chilling of the single phase composite liquid necessary to "almost" reach the composite liquid's "triple point temperature" $T_e$. For example, the point labeled "$Q(T_5)$" almost reaches point R in FIG. 1. Thus, for example, only slightly soluble gases such as nitrogen and air are not well suited to the practice of this process. On the other hand, the gas should not be so soluble that when the nominal high pressure is released to the system's nominal low pressure the gas will remain in solution, but rather will be virtually totally revaporized and, in so doing, take up its heat of condensation from the material surrounding it and thereby cool said material. This being the case, certain gases such as ammonia gas and hydrogen chloride gas, which are highly soluble in water, are not well suited to the practice of this invention when it is applied to aqueous systems. Carbon dioxide gas and sulfur dioxide gas, by way of contrast, are much better suited to the practice of this process in aqueous systems. However, it should again be noted that where the end product of the process is to be potable water, carbon dioxide is virtually the only suitable gas for the practice of this invention. That is to say that sulfur dioxide is suitable from a purely technical point of view, but it is not suited in situations where "potable" water is the desired end product. It also should be noted that carbonated water, as well as "pure" water are each possible "potable" end products of the application of this process and that carbonated water—in many cases—will have a higher economic value than that of uncarbonated water. In any case, this dissolving of the gas into the liquid feed solution results in a rise to a temperature $T_2$ for a combined gas and liquid feed due to absorption of the heat of condensation of the gas.

In order to avoid simple recovery of the identical amounts of heat by the dissolved gas, when it is evolved in a subsequent free expansion step of this process—and which would accomplish nothing but a gradual net heating due to losses and friction—the resulting solution (hereinafter often referred to as the single phase composite liquid) is brought to nearly ambient temperature by cooling in a first heat exchange means (which is most preferably an external heat sink such as, for example, a body of sea water). Thus, the resulting solution will lose a substantial portion of the heat of condensation of the dissolved gas, but not at the expense of a subsequent cooling effect produced by the Joule-Thompson free expansion. After this first heat exchange is made against a "heat sink", a second heat exchange (which is preferably, totally, made against a source of low temperature other than the heat sink of the first heat exchange means) is performed upon the single phase composite liquid material. This other source of low temperature could be supplied by, or augmented by, a cold stream or refrigeration sources completely external to this process, but for reasons of economics, it is highly preferred that this second heat exchange be carried out, as much as possible, or practical, against at least one of three phases (vapor, liquid and solid) of colder products of the Joule-Thompson free expansion step of the process.

The Joule-Thompson free expansion constitutes an irreversible adiabatic expansion of the single phase composite liquid material. In applicant's process, however, this adiabatic expansion is carried out at a temperature which is carefully contrived to permit an adiabatic expansion from a nominal high to a nominal low pressure in order to just approach (again, note the location of point $Q(T_5)$ in FIG. 1), the triple point temperature $T_e$ of the single phase composite solution. Thus, the expansion, with its consequent release of the gas dissolved in the single phase composite liquid material, will suffice to lower the temperature of the single phase composite liquid to approximately its triple point, especially when the single phase composite liquid, after the above noted first heat exchange, is "boot-strap" heat-exchanged, in a controlled manner, with cold effluent streams produced by said Joule-Thompson expansion which have temperatures which closely approximate the triple point temperature $T_e$ of the single phase composite liquid material. Indeed, there will be a valuable amount of surplus refrigeration made available by this means.

However, the realities of the thermodynamics and the economics associated with this process force several "restrictions" which must be obeyed in order to successfully practice said process. These restrictions include the fact that a gas phase, a liquid phase, and a solid phase each must result from the irreversible adiabatic expansion (i.e., the Joule-Thompson free expansion). It should also be noted that this requirement necessarily relates a certain temperature and a pressure for a "triple-point" which is thus completely determined when all compositional options implicit in Gibb's Phase Rule (i.e., the degrees of freedom plus the number of phases must equal the number of components plus two) have been used up. In other words, in applicant's process, there are no degrees of freedom remaining downstream of the irreversible adiabatic expansion. However, at the upstream end of this expansion there are two degrees of freedom, since applicant's process "contrives" (e.g., by temperature adjustment) to have only a single phase liquid present. That is to say that since the pressure is set (e.g., at the system's nominal high pressure) and the composition of the materials employed is likewise set, and since the gas quantity will be set to a given level by the adiabatic energy balance requirements, there can be only one degree of freedom remaining, namely, the temperature of the single liquid phase solution material entering the irreversible adiabatic expansion.

Thus, the most important operational variable of this process—which must be carefully "adjusted" for successful operation of the process—is the degree of chilling of the stream of single phase composite liquid which occurs in the second heat exchange means before said composite liquid is subjected to the Joule-Thompson free expansion. Stated in another way, there is a "brink" temperature or temperature "jumping off point" which, among other things, must obey the fundamental restriction that, ideally, no heat is to enter or leave the chamber in which the Joule-Thompson expansion is carried out. This restriction forces a situation in which a total given composition must necessarily exist under a precisely paired set of temperatures and pressures. That is to say that the brink temperature is that temperature of the single phase composite liquid such that a release of pressure from a nominal high pressure to a nominal low pressure results in evolution of essentially all of the dissolved gas which, upon vaporization, absorbs heat of condensation in that quantity of heat which is required to lower the temperature of the entire mass of the single phase composite liquid to the triple point temperature of said single phase composite liquid. In other words, once having set the nominal high pressure, the nominal low pressure, the composition of the composite liquid and once having fixed the lowest temperature of the process at the triple point brink temperature of the single phase composite liquid, the brink temperature is the only remaining operating parameter which can be "adjusted" so that when the dissolved gas leaves the composite liquid during the Joule-Thompson free expansion: (1) the evolution of the gas will absorb the heat of vaporization of said gas such that there will be a temperature reduction from the brink temperature to the triple point temperature of the single phase composite liquid. Consequently, the brink temperature must be controlled in order to be at that some prescribed temperature which satisfies the heat balance of the Joule-Thompson free expansion. This brink temperature can be calculated and/or determined by testing procedures.

For example, in the case of using the herein disclosed process to obtain potable water from sea water, once both nominal high pressure and nominal low pressure have been set and once the triple point temperature has been set at eutectic composition, only the brink temperature can be varied such that—upon the occurrence of the Joule-Thompson free expansion—all prescribed conditions will be met, namely: (1) the evolution of substantially all of the dissolved carbon dioxide will take place, (2) the precipitation of all surplus water in the single phase composite liquid, over and above saturation at the eutectic composition will occur, and (3) the energy in the Joule-Thompson free expansion will be the same going in as it is going out. That is to say that when these three conditions are satisfied, the solid precipitated material (i.e., ice) will represent "pure" surplus solvent and (potable) water thus can be obtained.

Again, it should also be noted that, ideally, the Joule-Thompson free expansion is most preferably completed at a point which lies just above the point represented by the eutectic concentration/ eutectic temperature point $C_e T_e$, e.g., at point $Q(T_5)$ as shown in FIG. 1 which lies just above point R. In other words, after the Joule-Thompson free expansion is completed, the concentration/temperature phase relationship should lie at a point $Q(T_5)$, which is "contrived" to be just above the point R, which represents the eutectic concentration and temperature $C_e T_e$. The expansion should not, however, be allowed to bring the lowest temperature produced by the expansion to some lower point below line $T_e\text{-}T_e$, such as point S, which would cause the formation of a completely frozen total product. This requirement also will set the amount of gas (e.g., carbon dioxide) to be dissolved in the single phase composite liquid. That is to say that this amount of gas is a "contrivance" which can be employed to cause the Joule-Thompson expansion to stop at point $Q(T_5)$ rather than go onto an undesired lower level such as point S. Such considerations can also set any amount of recycle brine employed such that the concentration of the single phase composite liquid will be near eutectic saturation when the carbon dioxide is evaporated and thereby freezing any net surplus water into ice.

It should also be understood that the herein disclosed processes, for reasons of economics and convenience, most preferably set relatively high nominal pressures (e.g., the pressure of the single phase composite liquid material at the exit point 22 of eductor 20) in a range from about 2 to about 20 atmospheres. However, the pressure in the chamber in which the Joule-Thompson expansion is carried out (the nominal low pressure) is most preferably set at approximately atmospheric pressure (for reasons of economics, if nothing else). In any case, the forced paired temperature for the total composition and for the nominal low pressure is, uniquely, the triple point temperature of the single phase composite liquid material. However, all of these circumstances will not occur "fortuitously." Hence, the temperature of the single phase composite liquid material must be carefully adjusted to the brink temperature just as it enters the nozzle which produces the Joule-Thompson free expansion of said single phase composite liquid material into the chamber which has the system's nominal low pressure. Thus, this process most preferably will include means for detecting this "brink temperature" and means (e.g., changes in heat exchange flow paths, changes in flow rates, etc.) for quickly adjusting this all-important process parameter. Thus, an achievement of the brink temperature to be paired with the nominal high pressure for a given composition, and the restriction of irreversible adiabatic expansion, will result, at a given pressure, which is most preferably atmospheric pressure, in production of the triple point temperature of the single phase composite liquid material. In other words, the herein disclosed three phase separation process for separating solutes from solvents is based upon the fact that, at some nominal high pressure, the temperature of a composite liquid can be adjusted in order to "poise" it on the "brink" of a particular Joule-Thompson free expansion. Consequently, the Joule-Thompson free expansion can be "precontrived", under the conditions employed in the herein disclosed process, to result in the formation of three phases of material.

In the process herein described, the gas which is to be employed also should be of greater volatility than that of the solvent vapor, whatever it may be, in the particular embodiment of this process being used. The gas species also may be selected on the basis of other criteria as well, e.g., (1) non-toxicity, (2) low cost, (3) ready availability, and most importantly, (4) on the basis of an intermediate solubility (hence, its appellation in this patent application: "partially soluble") such that at the nominal high pressure (and temperature), enough gas will dissolve in the solute/solvent solution—and on the basis that the gas will also be essentially totally evolved at the nominal low pressure (and triple point temperature and yet be such that its reacquisition of its latent heat, when it evolves from the single liquid phase solution, will chill the entire mass of the single phase composite liquid material down to its triple point.

In broad terms, the remainder of the herein disclosed processes deal with the practical aspects of machinery and utilities requirements; the chief of which concern the pumping power and cooling capacity required to bring the single phase composite liquid to an appropriate "brink" temperature for a given single phase composite liquid species. Conventional heat exchange equipment, most preferably in a series configuration, e.g., in "stages", employing the three effluent streams, each having the triple point temperature and distributed in a manner which is suited to the application and features to be favored or emphasized in some particular embodiment of these processes, can be widely varied. For example, the distribution of the respective vapor, liquid and solid phase products of these processes can be provided with a designed flexibility to accommodate varied process requirements such as the previously noted adjustments in solute concentration in the incoming feed stream (e.g., which can be increased by the interjection of brine into the incoming sea water). That is to say that various valving and manifold systems known to the art can be used to direct each of the materials produced by the Joule-Thompson free expansion to various points throughout the overall system. valving manifolds, heat sensing devices, pressure sensing devices and/or pump systems well known to the art can be employed for such varied purpose.

Stated in patent process terms, the herein described methods for separating a solute (or several solutes) from a solvent (or mixture of solvents), which together constitute a solute/solvent solution starting material having an initial concentration and an initial temperature $T_1$, will comprise: (1) introducing a partially soluble gas into an incoming solute/solvent solution which is placed under a nominal high pressure by a pump means in order to dissolve the partially soluble gas in the solute/solvent solution and thereby releasing the heat of condensation of the partially soluble gas into the solute/solvent solution and thus producing a dissolved gas/solute/solvent solution which takes the form, or is forced to take the form (i.e., forced to do so by temperature adjustment), of a single phase composite liquid ("single phase composite liquid") having a second temperature $T_2$ which is greater than the initial temperature $T_1$ of the solute/solvent solution starting material owing to the fact that the resulting solution has absorbed the heat of condensation of the dissolved gas; (2) introducing the single phase composite liquid material having the second temperature $T_2$ into a first heat exchange means in order to remove a quantity of heat from the single phase composite liquid material which approximates the heat of condensation of the gas and whose loss brings the single phase composite liquid material to a third temperature $T_3$ which, preferably, approximates the initial temperature $T_1$ of the incoming solute/solvent solution starting material; (3) introducing the single phase composite liquid material having the third temperature $T_3$ into a second heat exchange means (preferably employing a source of cold other than the source of cold employed by the first heat exchange means, e.g., other than the body of sea water), in order to lower the temperature of the single phase composite liquid material from the third temperature $T_3$ to a fourth, "brink", temperature $T_4$ which is such that a release of pressure on the single phase composite liquid from a nominal high pressure to a nominal low pressure results in the evolution of substantially all of the dissolved gas which, upon vaporization, absorbs heat of condensation in a quantity which is required to lower the temperature of an entire mass of the single phase composite liquid to a temperature which approximates the triple point temperature of said single phase composite liquid (e.g., the temperature at point $Q(T_5)$ in FIG. 1); (4) subjecting the single phase composite liquid material to a Joule-Thompson free expansion into a vessel under a nominal system low pressure (which preferably is at or near atmospheric pressure) and thereby obtaining three resultant materials having three distinct phases and which each have a temperature $T_5$ which approximates the triple point temperature $T_e$ of the single phase composite liquid material, and wherein the three phases will comprise a vapor phase product containing the partially soluble gas (e.g., carbon dioxide) which was originally dissolved in the incoming solute/solvent solution, a liquid phase product (e.g., brine) containing a solute (e.g., sodium chloride) concentration greater than that of the solute/solvent solution starting material which originally came into the system and a solid phase product material (e.g., ice) which contains a solute (e.g., salt) in a concentration substantially less than that of the original solute/solvent solution starting material; and (5) collecting at least one of the resultant materials (e.g., the solvent or the solute) as a product of this three phase separation process. For the purposes of this patent disclosure, the expression a solute concentration "substantially less" than that of the original solute/solvent solution—in the case applying this process to sea water—can be taken to mean that the ice product has a salt concentration which is low enough to render the water resulting from melting said ice to a "potable" condition.

In some of their most preferred embodiments the herein disclosed processes can be adapted to various completely separate and distinct embodiments of the basic process noted above: such distinct embodiments can be used with a view toward: (1) using sea water as the solute/solvent solution starting material, (2) using carbon dioxide as the partially soluble gas, (3) using a jet eductor as the means for introducing the partially soluble gas into the solute/ solvent solution (and especially using a jet eductor wherein a sea water solution is employed as a motive fluid and the partially soluble gas is carbon dioxide gas educted into the sea water solution), (4) using a portion of a resulting liquid phase material (e.g., brine) produced by the Joule-Thompson free expansion of the single phase composite liquid material to augment the incoming sea water solution starting material, (5) adjusting the incoming sea water solution starting material to a temperature which is different from the temperature $T_1$ of the incoming sea water solution starting material by use of a stream of one or more of the products of the Joule-Thompson free expansion, (6) lowering the sea water solution starting material to a temperature which is less than temperature $T_1$ of an incoming sea water solution starting material by heat exchanging said sea water solution starting material against an ice product produced by the Joule-Thompson free expansion, (7) returning the vapor phase material (e.g., carbon dioxide vapor) produced by the Joule-Thompson free expansion, after heat exchanging the vapor phase material against the single phase composite liquid, to an initial stage of the herein disclosed process and redissolving said vapor phase material into a new, incoming portion of starting material, (8) returning a carbon dioxide vapor produced by the Joule-Thompson free expansion "directly" to the jet eductor, i.e., without heat exchanging the carbon dioxide vapor before it is reused, (9) lowering the temperature of the single phase composite liquid material from the third temperature $T_3$ attained in the first heat exchange means to a fourth temperature $T_4$ which is such that a release of pressure on the single phase composite liquid from a nominal high pressure to a nominal low pressure results in the evolution of substantially all of the dissolved gas which, upon vaporization, absorbs heat of condensation in a quantity which is required to lower the temperature of an entire mass of the single phase composite liquid to a temperature $T_5$ which approximates the triple point temperature of said single phase composite liquid by heat exchanging said single phase composite liquid by against at least one of the three resultant materials (the vapor, the liquid and/or the solid product material) produced by the Joule-Thompson free expansion, e.g., heat exchanging the composite liquid against the resultant materials selected from the group consisting of the Joule-Thompson free expansion's carbon dioxide, vapor phase product, its brine, liquid phase product or, in essence, its ice solid phase product, (10) modifying the incoming sea water solution starting material containing a solute concentration which is less than that of eutectic composition (e.g., by mixing an incoming sea water starting material with process pure water), at its triple point, in order that the ice which is obtained from the Joule-Thompson free expansion of the single phase composite liquid material is a substantially pure solid product and the resulting liquid phase product approaches the eutectic composition of the single phase composite liquid material, (11) making the solute/solvent solution starting material contain a solute concentration greater than that of the single phase composite liquid material's eutectic composition, at its triple point, in order that a solute material is obtained from the Joule-Thompson free expansion, (12) employing a resultant material from the Joule-Thompson free expansion selected from the group of resultant materials consisting of its vapor phase product, its liquid phase product or its solid phase product for refrigeration purposes outside of the herein disclosed process for separating a solute from a solvent, (13) employing a resultant material from the Joule-Thompson free expansion selected from the group of resultant materials consisting of its vapor phase material, its liquid phase material or its solid phase material to adjust the temperature conditions (by heat exchange, but in the absence of a physical mixing of materials) of the jet eductor in which the partially soluble gas is dissolved into the solute/ solvent solution starting material in order to obtain a temperature which promotes obtaining a single phase composite liquid material product from the jet eduction process, (14) heat exchanging the solid phase material against the heat contained in the single phase composite liquid material after said single phase composite liquid material leaves the first heat exchange means, but before it enters the second heat exchange means, (15) employing a resultant material from the Joule-Thompson free expansion selected from the group consisting of resultant materials consisting of its vapor phase product, its liquid phase product or its solid phase product to aid in the production of a brink temperature $T_4$, which is such that a pressure drop on the single phase composite liquid from a nominal high pressure to a nominal low pressure results in the evolution of substantially all of the dissolved gas which, upon vaporization, absorbs heat of condensation in a quantity which is required to lower the temperature of an entire mass of the single phase composite liquid to a temperature which approximates the triple point temperature of said single phase composite liquid by heat exchanging said single phase composite liquid, (16) using a portion of the water formed by melting the ice product of the Joule-Thompson free expansion in order to wash away surface brine from another portion of the ice produced by said Joule-Thompson free expansion, and (17) using the liquid phase product (or a portion of said product), e.g., such as a brine product, in order to raise the initial solute concentration of the incoming feed liquid (e.g., incoming sea water) artificially upward so that the composition of the single phase composite liquid entering the nozzle will result in a liquid phase product leaving the nozzle which very closely approximates the eutectic composition of the single phase composite liquid material.

It should again be noted that in addition to desalination of sea water or other "brackish" water, this process may be employed to separate the components of many kinds of industrial solutions (nonaqueous industrial solutions, as well as aqueous industrial solutions). For example, it may be used in conditioning sludges and hydrophilic colloids, for, say, facilitating dehydration operations. That is to say that when a sludge or a hydrophilic colloid is substantially completely frozen and melted, the resulting water can be separated from the conditioned sludge or conditioned colloid by a simple filtration operation. By way of further example, the herein disclosed process also may be employed to great advantage to recover salts other than sodium chloride (e.g., potassium chloride), from various industrial by-product fluids such as those released from pulping mills, cement factories, public utilities and the like. In one highly preferred embodiment of this invention, where "potability" is not an issue, potassium sulfate can be obtained from the stack gases of cement kilns and treated by the herein disclosed process to concentrate said potassium sulfate. This is an important application for this process because this form of potassium sulfate can only be recovered by prior art methods in extremely dilute solutions which are predominantly the calciferous washings of the kiln's stack dust. Applicant's process can improve upon this situation by providing a way in which the potassium sulfate can be concentrated to a point where it can be sold as a commercial product or at least more economically handled for disposal purposes.

It should also be noted that this process can be made very compact because it requires only small liquid pumps, rather than compressors, as its only "moving parts". Consequently minor amounts of electric power are the only utilities needed. It also should be pointed out that this process can be made into devices small enough to produce ice from tap water in homes, restaurants and like-sized enterprises needing ice; that is to say that the process can be employed to produce ice even though the incoming water stream is already "potable" water. The advantage of this process in this circumstance is the ability of this process to produce ice without the use of freon gases which are known to be harmful to the earth's ecology and which are now under attack from several environmental quarters.

DESCRIPTION OF THE PREFERRED EMBODIMENTS

As was previously discussed, FIG. 1 depicts a temperature-concentration phase diagram for a typical solute/solvent solution system. It was discussed in the "Summary Of The Invention" portion of this patent disclosure and, thus, requires no further comment.

Figure 2:
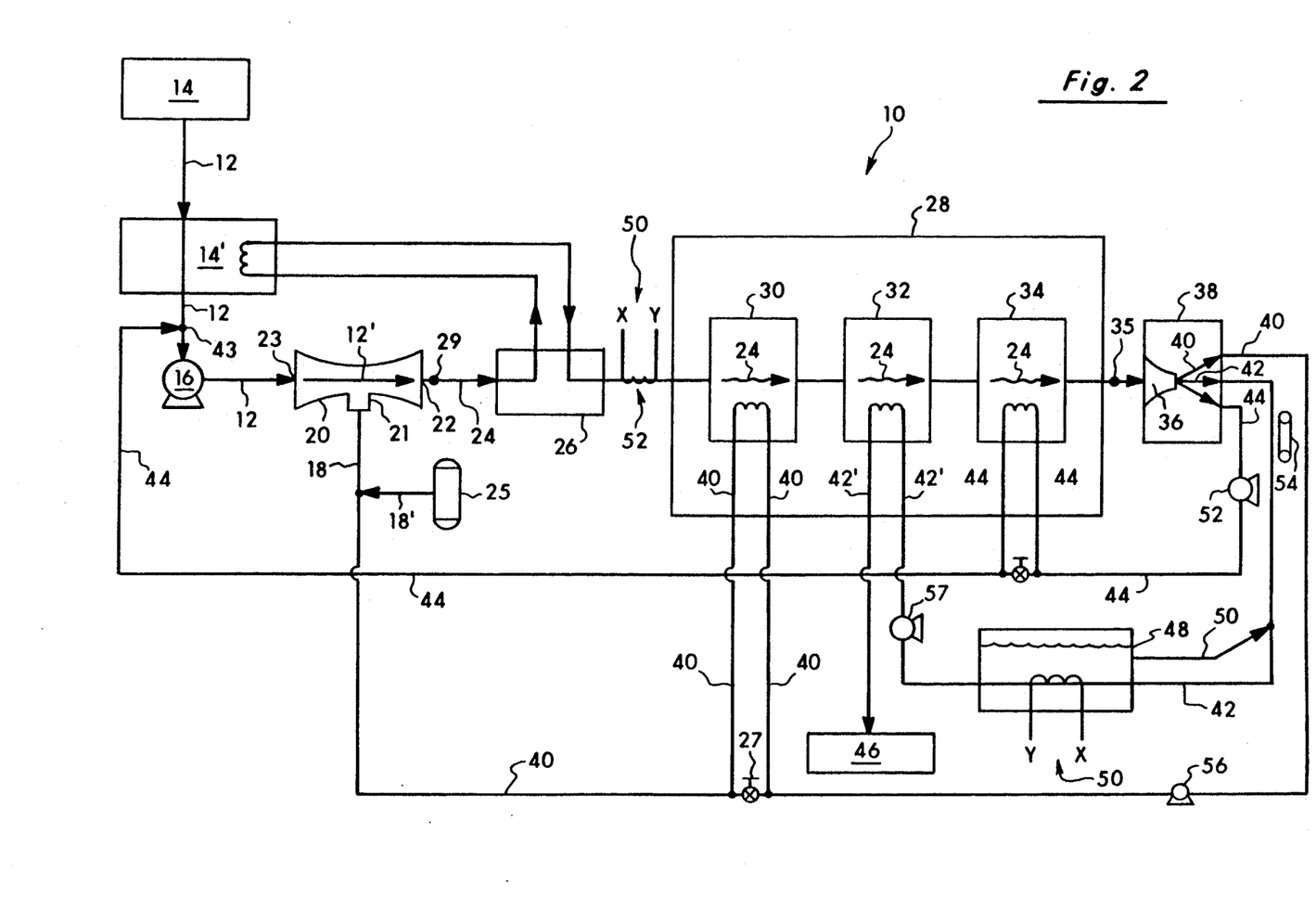
FIG. 2 depicts a process flow sheet for some representative embodiments of the herein disclosed processes, especially those wherein certain products resulting from the Joule-Thompson free expansion are used as heat exchange media in heat exchangers employed to carry out said processes.

FIG. 2 is a flow diagram of one particularly preferred embodiment of the overall processes 10 used to carry out this invention. This embodiment begins by obtaining a solute/solvent solution starting material 12 which has an initial solute (e.g., a salt) concentration in a solvent (e.g., water) and an initial temperature $T_1$. The starting material can be obtained from a suitable source 14 (e.g., a body of sea water, a body or stream of an industrial waste fluid source having one or more solutes in a liquid solvent, etc.) which is comprised of said solute/solvent solution. A pump 16 can be readily employed to obtain the solute/solvent solution and to place it under pressure The solute/ solvent solution 12 is then mixed, preferably while it is under pressure (for example, under the pressure supplied by pump 16), with a partially soluble gas 18 in order to dissolve said partially gas 18 in the solute/solvent solution 12 and in order to produce a single phase composite liquid material 24.

A most preferred method of dissolving the partially soluble gas 18 into the solute/ solvent solution starting material 12, under a relatively high pressure (e.g., 20 to 300 psi), is through the use of a jet eductor 20 wherein the solute/solvent solution 12, under the pressure supplied by pump 16, is driven through the jet eductor 20 as a motive fluid 12' in order to educt the partially soluble gas 18 (e.g., carbon dioxide), which enters the eductor 20 via the inlet port 21 of said jet eductor 20, into the motive fluid 12' and thereby dissolving said gas 18 into said solute/solvent solution 12. This dissolving of the gas 18 into the solute/solvent solution 12, be it through the action of jet eductor 20 or by other means for dissolving a gas into a liquid under pressure (not shown in FIG. 1), will cause the gas 18 to give up its heat of condensation and thereby raise the temperature of the resulting dissolved gas/solute/ solvent solution 24 (which has been, and will be, referred to as a single phase composite liquid material 24 for the purposes of this patent disclosure) to some temperature $T_2$ which is higher than the temperature $T_1$ of the incoming solute/solvent solution 12 starting material.

At this point, it also should be noted in passing that the mechanical inefficiency of jet eductors of this type will cause the pressure of the motive fluid 12' leaving the jet eductor 20 to be considerably less than the pressure placed on the motive fluid 12' by the pump 16 as said motive fluid 12' just enters the jet eductor 20. Pressure losses of 20 percent to as high as 95 percent will not be uncommon in such jet eductors, depending on various operating parameters such as the pressure supplied by the pump or pumps employed, the temperature of the solute/solvent solution, the temperature of the gas educted, the volume of solute/solvent solution, the volume of gas educted, the chemical nature of the various fluids, the temperature at which the jet eductor itself is operated, etc. This being the case, the term "nominal" high pressure, for the purposes of this patent disclosure, should be regarded as the pressure at the flow exit end 22 of the jet eductor 20, rather than the pressure supplied by the pump 16 at the flow entrance end 23 of said jet eductor 20. Thus, it is the pressure at the flow exit end 22 which should be from about 2 to about 20 atmospheres.

In any case, the resultant liquid product of dissolving the partially soluble gas 18 into the solute/solvent solution 12 should be a "single phase composite liquid" 24. That is to say that this single phase composite liquid 24 should be a liquid material having no undissolved solid phase material and no undissolved gas phase material mixed in with said single phase composite liquid 24. In other words, the liquid exiting the jet eductor 20 should be essentially a single liquid phase even though the liquid contains solute(s) and gases dissolved into said liquid.

In order to meet the requirement that the liquid exiting the jet eductor 20 be a single phase composite liquid, there will exist an upper limit of temperature $T_{max}$, given the amounts and temperatures of the materials (motive fluid 12' and educted fluid 18) entering the jet eductor 20, at their respective quantities and temperatures, above which the jet eduction action should not be employed. That is to say that if this temperature $T_{max}$ is exceeded the fluid exiting the eductor 20 will not be a single phase composite liquid, but rather will be a mixture of a liquid phase material and a gas phase material. This condition is undesirable and should be avoided to the fullest extent possible Therefore it is necessary that such an upper temperature limit $T_{max}$ be determined by calculation or test results. In other words, below this upper limit temperature $T_{max}$, only a single liquid phase will exit the eductor 20 and this is to be sought to the fullest extent possible. To this end sensor device(s) 29 can be positioned near the exit end 22 of said eductor 20 to insure that this operating condition is obtained and maintained. However, it also should be noted that for all practical purposes, the closer the jet eductor 20 is operated to this upper temperature limit $T_{max}$, the more favorable the overall economics of the process will become. This upper temperature limit can be avoided by adjusting the temperatures of the fluids coming to jet eductor 20 by heat exchanging them, partially heat exchanging them and/or not heat exchanging them against the single phase composite liquid or against some other source of "heat" or source of "cold."

Those skilled in this art will of course appreciate that within these restrictions, known performances of commercially available eductors, for the inlet conditions of quantities, temperatures and pressures of motive and educted fluid, can be obtained from the eductor manufacturer, or can be readily calculated. In either case, however, once obtained, this information then can be used to predict the outlet temperature and pressure of a given single phase composite liquid material such as sea water into which, carbon dioxide has been dissolved. Temperature sensor devices 29 can be employed to great advantage to assure that the operating temperature of the jet eductor 20 is such that only a single phase composite liquid leaves said eductor 20. Moreover, and more to the point of the herein disclosed process, some desired temperature and pressure of a given single phase composite liquid can be used as a "design" basis or criterion for selection of the most appropriate eduction equipment in view of the values of the temperatures, pressures and quantities of the fluid materials fed into the eductor as the motive fluid 12' and as the educted fluid (i.e., the gas 18). That is to say that good "design" can serve to minimize the need to "adjust" the eductor's operating temperature.

Be that as it may, the next step in the overall process 10 is to introduce the single phase composite liquid material 24 having a temperature $T_2$ into a first heat exchange means 26 in order to remove a quantity of heat from said single phase composite liquid material 24 which approximates the quantity of heat represented by the heat of condensation of the gas 18 which was given up to the single phase composite liquid material 24 in dissolving therein and whose loss will bring said single phase composite liquid material 24 back to some third temperature $T_3$, which, preferably, approximates the initial temperature $T_1$ of the original solute/solvent starting material 12. Again, this heat exchange is most preferably carried out against a portion 14' of the "source" solute/solvent solution (e.g., carrying out this heat exchange against a large body of sea water) which, in effect, acts as a "heat sink" for the heat of condensation of the gas 18; this heat exchange should not, however, be carried against the products of the Joule-Thompson free expansion. Thus by heat exchange against, say, a heat sink, the temperature $T_3$ of the single phase composite liquid material 24 can be readily made to approximate the temperature $T_1$ of the solute/solvent solution 12 starting material (e.g., sea water, at its ambient temperature $T_1$).

Once this first temperature exchange is accomplished, the single phase composite liquid material 24, at a nominal system high pressure and temperature $T_3$, is then introduced into a second heat exchange means 28 wherein a second heat exchange is performed upon the single phase composite liquid material 24. Again, this second heat exchange means most preferably, should employ a source of cold completely distinct from the source of cold employed by the first heat exchange means. Again, use of so-called "boot-strap" heat exchanges against one or more products of the Joule-Thompson free expansion—for reason of economics and efficiency—are the preferred means of bringing the single phase composite liquid to brink temperature $T_4$. Most preferably this second heat exchange means 28 will be comprised of a series of heat exchange zones such as a first heat exchange zone 30, a second heat exchange zone 32, and a third heat exchange zone 34, etc. such as those generally depicted in FIG. 2. By this means, the single phase composite liquid material 24 can be progressively chilled as it passes through a series of such heat exchange zones until said single phase composite liquid material 24 eventually reaches a "brink" temperature $T_4$ which is such that a release of pressure on the single phase composite liquid 24 from a nominal high pressure to a nominal low pressure results in the evolution of substantially all of the dissolved gas which, upon vaporization, absorbs heat of condensation in a quantity which is required to lower the temperature of an entire mass of the single phase composite liquid to a temperature $T_5$ which approximates the triple point temperature $T_e$ of said single phase composite liquid. Again, those skilled in this art will appreciate that a Joule-Thompson free expansion constitutes an irreversible, adiabatic expansion, from the system's nominal high pressure (e.g., 2–20 atmospheres) to its nominal lower pressure (which most preferably, approximates atmospheric pressure) of the single phase composite liquid material 24 and that such an expansion is most preferably carried by use of a nozzle 36 which sprays into a chamber 38, and in this case into a chamber 38 most preferably having a pressure of about one atmosphere. Temperature sensor means 35 can be placed between the heat exchange means 28 and the nozzle 36 to monitor the brink temperature $T_4$ and/or to effect adjustments of said temperature $T_4$ by changing heat exchange paths, material quantities, temperatures, etc.

If the various operating conditions of the process have been properly set and adjusted, the Joule-Thompson free expansion of the single phase composite liquid material 24 through nozzle 36 will lower the temperature of said single phase composite liquid material 24 to near its triple point temperature $T_5$ and thereby produce three distinct phases of cold material. The first phase 40 will be essentially a pure vapor (e.g., carbon dioxide vapor with only minor amounts of water vapor). The second phase 42 will be essentially a pure, solid solvent (e.g., ice) or pure solid solute (e.g., sodium chloride)—but not both—and the third phase will be a liquid 44 (e.g., brine) whose solute concentration can be made to be more than (or under proper initial mixing conditions, less than) that of the solute/solvent solution starting material 12. As dictated by material and energy conservation, the solution of remaining solvent and solute (e.g., brine) can be made to be a liquid 44 which approaches the saturation (eutectic) composition at the triple point temperature $T_e$ of the given material.

It again should be noted that a portion of such a liquid 44 (e.g., brine) can be recycled back to the initial stages of this process for recombination with an incoming stream of new feed material, i.e., with a new portion of the incoming stream of solute/solvent solution 12. As was previously noted, this recycling can serve to provide a compositional flexibility to enable an approach to saturation as a process adjustment technique. To this end, FIG. 2 depicts a stream of the liquid 44 (the liquid phase product of the Joule-Thompson free expansion, e.g., brine) being sent back to be mixed, at point 43 for example, with the incoming stream of solute/solvent solution 12. In this particular embodiment of this process, the stream of liquid 44 is shown being heat exchanged against the single phase liquid composite material 24 in zone 34 of heat exchange means 28. That is to say that since liquid of stream 44 will have a temperature $T_5$ which is lower than that of the temperature of the single phase composite liquid material 24 flowing through heat exchanger 28, the two streams can be heat exchanged against each other. Ideally the heat exchange in zone 34 should produce a temperature in the single phase composite liquid material 24 which constitutes the "brink" temperature $T_4$ previously discussed.

FIGS. 2 also is intended to indicate that there will also be other vessels (e.g., 46, 48, etc.), heat exchanger zones (e.g., zone 50), pumps (e.g., 52 and 56) employed in order to use the material of these three phases to some of, or all of, the extent of the available refrigeration they are capable of providing. The nature and relative importance of the refrigeration capabilities of the materials which comprise the three phases produced by the Joule-Thompson free expansion might include certain considerations. First, it should be emphasized that the temperatures of the recycle gas (e.g., carbon dioxide) can be adjusted to encourage production of a single phase composite liquid material 24 in the eductor 20. For example, one such temperature "adjustment" can be accomplished by heat exchanging the gas 40 against the single phase composite liquid material 24 (e.g., in zone 30 of heat exchanger 28) before it is re-educted into a gas inlet port 21 of eductor 20. However, as depicted by the presence of valve means 27, the gas 40 also can be sent straight back to the inlet nozzle 21 of eductor 20 without being heat exchanged against the single phase composite liquid 24 in zone 30 (or in any other zone 32 or zone 34, etc.). It should also be noted that a stream of gas 40 obtained from the Joule-Thompson free expansion can be augmented by gas 18' from a make-up source 25 of gas.

FIG. 1 also depicts how some or all of the solid phase material 42 can be sent, e.g., by conveyor means 54, to a melting vessel 48 wherein all solvent water is maintained as a two-in-one solid/liquid mixture 45 from which a liquid solvent (e.g., water) 42' can be obtained. Moreover, one or more true counter-flow heat exchangers (e.g., 30, 32, 34, etc.) can employ a stream of such liquid solvent 42'. Stream 51 can be used to wash surface brine from ice, etc.) from the vessel 48 in which the ice and water are mixed and maintained. It also should be noted that the ice/water mixture in vessel 48 can be used in a heat exchange means 50 which is depicted by coil X-Y in vessel 48, against the single phase composite liquid 24 at a point 52 located between the first heat exchanger 26 and the second heat exchanger 28. This heat exchange will result in production of a cold liquid (e.g., cold water) which then can be used (as indicated by stream line 47) to cool the single phase composite liquid 24. This can be done, for example, in zone 32 of heat exchanger 28.

Those skilled in the art will also appreciate that heat exchangers 26, 28 and 50 may have inlet and outlet stream conduits fixed in various manifold arrangements known to this art. That is to say that the various product streams from the Joule-Thompson free expansion can be manifolded to provide material mixing, surface area, etc., flexibility in changing quantities and duties of the fluids employed in this process. In any case the principal effect of the "series" cooling should be that of progressive cooling of the single composite liquid 24 so that a brink temperature $T_4$ is attained by said composite liquid arrives at the expansion nozzle 36. In any event one of the most desired products of the expansion can be the "pure" water 42' which is collected in vessel 46. Moreover, some of this pure water 42' can be directed back, e.g., as by stream, 51, to wash surface solute (e.g., brine) from the solid product 42 (e.g., ice) after it is removed (e.g., by conveyor belt means 54) from the vessel 38 in which the Joule-Thompson free expansion is conducted.

Finally, those skilled in this art will appreciate that the herein disclosed processes should in no way be limited to the examples and figures given above, but rather the full scope and spirit of this patent disclosure should only be limited by the claims which follow.

Thus having disclosed this invention, what is claimed is:

1. A process for separating a solute from a solvent which together constitute a solute/solvent solution starting material having an initial solute concentration and an initial temperature $T_1$, said process comprising:

(1) introducing a partially soluble gas into the solute/solvent solution in order to dissolve the partially soluble gas in the solute/solvent solution and thereby releasing the heat of condensation of the gas into said solution and in order to produce a dissolved gas/solute/solvent solution which takes the form of a single phase composite liquid material having a second temperature $T_2$ which is greater than the initial temperature $T_1$ of the solute/solvent solution starting material;

(2) placing the single phase composite liquid under a nominal high pressure by use of a pump means;

(3) introducing the single phase composite liquid having the second temperature $T_2$ into a first heat exchange means having a source of cold in order to remove a quantity of heat from the single phase composite liquid which approximates the heat of condensation of the dissolved gas and whose loss brings the single phase composite liquid to a third temperature $T_3$ which approximates the initial temperature $T_1$ of the solute/solvent solution starting material;

(4) introducing the single phase composite liquid having the third temperature $T_3$ into a second heat exchange means employing a source of cold other than the source of cold employed by the first heat exchange means in order to lower the temperature of the single phase composite liquid from the third temperature $T_3$ to a fourth temperature $T_4$ which is such that a release of pressure on the single phase composite liquid from the nominal high pressure to a nominal low pressure results in evolution of substantially all of the dissolved gas which, upon vaporization, absorbs heat of condensation in a quantity which is required to lower the temperature of an entire mass of the single phase composite liquid to a temperature $T_5$ which approximates the triple point temperature of said single phase composite liquid;

(5) subjecting the single phase composite liquid to a Joule-Thompson free expansion into a vessel having a nominal system low pressure and thereby obtaining three phases of resultant materials which each have a temperature $T_5$ which approximates the triple point temperature of the single phase composite liquid and wherein said three phases of resultant materials will include a vapor phase product containing the gas dissolved in the single phase composite liquid material, a liquid phase product containing a solute concentration different from the solute concentration of the solute/solvent solution starting material and a solid phase product containing a solute concentration different from that of the solute/solvent solution starting material; and (6) collecting at least one of the three phases of resultant materials as a product of the process.

2. The process of claim 1 wherein the solute/solvent solution starting material is sea water.

3. The process of claim 1 wherein the solute/solvent solution starting material is an industrial waste liquid.

4. The process of claim 1 wherein the partially soluble gas is carbon dioxide.

5. The process of claim 1 wherein the introduction of the partially soluble gas into the solute/solvent solution is accomplished by means of a jet eductor wherein the solute/solvent solution is employed as a motive fluid and the partially soluble gas is educted into said solute/solvent solution.

6. The process of claim 1 wherein the solute/solvent solution starting material is augmented by a portion of the liquid phase material produced by the Joule-Thompson free expansion of the single phase composite liquid material in order to produce a liquid phase product which approximates the eutectic composition of the single phase composite liquid.

7. The process of claim 1 wherein the single phase composite liquid is formed, in part, by adjusting an operating temperature of the jet eductor.

8. The process of claim wherein the temperature $T_5$ which approximates a triple point temperature $T_e$ of the single phase composite liquid lies just slightly above said triple point temperature $T_e$.

9. The process of claim 1 wherein the solute/solvent solution starting material is raised to a temperature which is greater than the temperature $T_1$ of an incoming solute/solvent solution starting material by pumping said incoming solute/solvent solution starting material and thereupon employing said starting material as a motive fluid for a jet eductor.

10. The process of claim 1 wherein the vapor phase product produced by the Joule-Thompson free expansion is heat exchanged against the single phase composite liquid before it is returned to an initial stage of the process and redissolved into a new, incoming portion of solute/solvent solution starting material.

11. The process of claim 1 wherein the vapor phase product produced by the Joule-Thompson free expansion is directly returned to an eduction port of a jet eductor and educted into a solute/solvent solution which is used as a motive fluid in said jet eductor.

12. The process of claim 1 wherein the lowering of the temperature of the single phase composite liquid from the third temperature $T_3$ to a fourth temperature $T_4$ is accomplished by heat exchange with a resultant material from the Joule-Thompson free expansion selected from the group of resultant materials consisting of its vapor phase product, its liquid phase product or its solid phase product.

13. The process of claim 1 wherein the solute/solvent solution starting material is mixed with a liquid product of the Joule-Thompson free expansion, in order to form a solute concentration in excess of that of an eutectic composition, at its triple point, so that solute can be obtained from the Joule-Thompson free expansion of the single phase composite liquid.

14. The process of claim 1 wherein the solute/solvent solution starting material is sea water mixed with a brine product of the Joule-Thompson free expansion in order to make a feed liquid which contains a sodium chloride concentration greater than that of sea water in order that the ice obtained from the Joule-Thompson free expansion of the single phase composite liquid material is obtained as a substantially pure ice product.

15. The process of claim 1 wherein a resultant material from the Joule-Thompson free expansion selected from the group of resultant materials consisting of its vapor phase material, its liquid phase material or its solid phase material are employed for refrigeration purposes outside of the process for separating the solute from the solvent.

16. The process of claim 1 wherein a resultant material from the Joule-Thompson free expansion selected from the group of resultant materials consisting of its vapor phase material, its liquid phase material or its solid phase material are employed to control operating conditions of a jet eductor in which the gas is dissolved into the solute/solvent solution starting material in order to form the single phase composite liquid.

17. A process for obtaining potable water from a sea water solution staring material comprised of a salt component dissolved in a water component and having an initial salt component concentration and an initial temperature $T_1$, said process comprising:

(1) pumping the sea water solution into an eductor;

(2) educting carbon dioxide gas into the sea water solution by use of a jet eductor wherein the sea water solution is pumped into the jet eductor as a motive fluid and the carbon dioxide gas is educted into the jet eductor and, hence, dissolved into the sea water solution and thereby releasing the heat of condensation of the carbon dioxide gas into said sea water solution and producing a dissolved carbon dioxide gas/salt component/water component solution in the form of a single phase composite liquid having a nominal high pressure and a second temperature $T_2$ which is greater than the initial temperature $T_1$ of the sea water solution starting material and wherein at least a portion of the carbon dioxide educted into the sea water solution is obtained from a subsequent Joule-Thompson free expansion step of the process;

(3) introducing the single phase composite liquid having the second temperature $T_2$ into a first heat exchange means which uses a body of sea water as a source of cold in order to remove a quantity of heat from the single phase composite liquid which approximates the heat of condensation of the carbon dioxide in order to bring the single phase composite liquid to a third temperature $T_3$ which approximates the initial temperature $T_1$ of the sea water starting material and wherein the operating temperature conditions of the eductor are adjusted to promote production of a single phase composite liquid which is comprised of dissolved carbon dioxide, a salt component and a water component by use of temperature adjusting means which include use of the temperature contained in a carbon dioxide vapor produced by the Joule-Thompson free expansion of the single phase composite liquid;

(4) introducing the single phase composite liquid having a third temperature $T_3$ into a second heat exchange means which is at least partially cooled by heat exchange with a resultant material from the Joule-Thompson free expansion which has a temperature $T_5$ which approximates a triple point temperature $T_e$ of the single phase composite liquid and which resultant material is selected from the group of resultant materials consisting of the Joule-Thompson free expansion's vapor phase product, its liquid phase product or its solid phase product in order to lower the temperature of the single phase composite liquid from the third temperature $T_3$ to a fourth temperature $T_4$ which is such that a release of pressure on the single phase composite liquid from the nominal high pressure to a nominal low pressure results in the evolution of substantially all of the dissolved carbon dioxide which, upon vaporization, absorbs heat of condensation in a quantity which is required to lower the temperature of an entire mass of the single phase composite liquid to a temperature which approximates the triple point temperature $T_5$ of said single phase composite liquid;

(5) subjecting the single phase composite liquid to a Joule-Thompson free expansion into a vessel under a nominal system low pressure and thereby obtaining three phases of resultant product materials each have a temperature $T_5$ which approximates the single phase liquid's triple point temperature and which will include a vapor phase product containing the carbon dioxide gas originally dissolved in the single phase composite liquid, a brine-like liquid phase product containing a salt component concentration greater than the salt component concentration of the sea water starting material and an ice-like, solid phase product containing a salt component concentration which is substantially less than the salt component concentration of the sea water starting material and such that when the ice-like, solid phase product is melted, the resulting water is potable;

(6) recycling the carbon dioxide vapor produced by the Joule-Thompson free expansion of the single phase composite liquid material back for re-eduction into the jet eductor;

(7) separating the ice-like, solid phase product material from its association with the brine-like liquid phase product and from the carbon dioxide, vapor phase product of the Joule-Thompson expansion; and (8) melting the ice-like, solid phase product material to obtain potable water.

18. The process of claim 17 wherein the brine-like liquid phase product is mixed with incoming sea water to raise the solute concentration of the sea water such that a composition of the single phase composite liquid entering the Joule-Thompson free expansion will result in a liquid product which approximates the eutectic composition of the single phase composite liquid.

19. The process of claim 17 wherein the brine-like liquid phase product having a temperature $T_5$ is used as a heat exchange fluid in a heat exchange system which serves to lower the temperature of the single phase composite liquid material to a brink temperature $T_4$.

20. The process of claim 17 wherein the ice-like, solid phase product material is melted by heat exchange against the single phase composite liquid after said single phase composite liquid leaves the first heat exchange means, but before it enters the second heat exchange means.

21. The process of claim 17 wherein a portion of the water formed by melting the ice-like solid phase product is used to wash away surface brine from ice subsequently produced by the Joule-Thompson free expansion.

22. The process of claim 17 wherein the solute/solvent solution starting material is mixed with a product of the Joule-Thompson free expansion, in order to form a solute concentration in excess of that of an eutectic composition, at its triple point, so that solute is obtained from the Joule-Thompson free expansion of the single phase composite liquid material.

* * * * *